United States Patent
Aiba et al.

(10) Patent No.: US 7,326,366 B2
(45) Date of Patent: Feb. 5, 2008

(54) METHOD OF PRODUCING INORGANIC SEMICONDUCTOR-OR PHOSPHOR-PRIMARY PARTICLE AND INORGANIC SEMICONDUCTOR-OR PHOSPHOR-PRIMARY PARTICLE

(75) Inventors: Satoshi Aiba, Minami-ashigara (JP); Shigeharu Urabe, Minami-ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 245 days.

(21) Appl. No.: 10/968,332

(22) Filed: Oct. 20, 2004

(65) Prior Publication Data

US 2005/0122027 A1   Jun. 9, 2005

(30) Foreign Application Priority Data

Oct. 22, 2003 (JP) ............................. 2003-362600
Mar. 26, 2004 (JP) ............................. 2004-093009

(51) Int. Cl.
  *C22B 3/00* (2006.01)
(52) U.S. Cl. ............................................ 252/301.6 S
(58) Field of Classification Search ......... 252/301.6 S, 252/301.4 S, 301.4 R
  See application file for complete search history.

(56) References Cited

U.S. PATENT DOCUMENTS 3,872,222 A * 3/1975 Barnes .................... 117/68
3,929,665 A * 12/1975 Gazzarrini et al. ... 252/301.4 S
6,939,480 B2 * 9/2005 Aoki et al. ........... 252/301.4 F

FOREIGN PATENT DOCUMENTS

| JP | 05-254830 | * | 10/1993 |
| JP | 2002-226844 | * | 8/2002 |
| JP | 2002-313568 A | | 10/2002 |
| WO | WO 02/090262 | * | 11/2002 |
| WO | WO 03/036675 | * | 5/2003 |

OTHER PUBLICATIONS

Derwent abstract for CN 1513755 published Jul. 21, 2004.*
Tadao Sugimoto et al., "Synthesis of Uniform Particles of CdS, ZnS, PbS, and CuS from Concentrated Solutions of the Metal Chelates", Colloids and Surfaces A: Physicochemical and Engineering Aspects, vol. 135, 1998, pp. 207-226.
B.G. Wang et al., "On the Morphological Changes and Twinning of ZnS (Sphalerite) Crystallites Under Hydrothermal Conditions", Cryst. Res. Technol., vol. 35, No. 3, 2000, pp. 279-289.

* cited by examiner

*Primary Examiner*—C. Melissa Koslow
(74) *Attorney, Agent, or Firm*—Buchanan Ingersoll & Rooney PC

(57) ABSTRACT

A method of producing inorganic semiconductor- and phosphor-primary particles, which each comprises forming the particles by reacting at least one kind of precursor solution of the inorganic primary particle in a solvent, of which major component is water of a reacting vessel, under the conditions that the pressure is 0.2 to 20 MPa and the temperature is 120° C. to 370° C.; and inorganic semiconductor- and phosphor-primary particles produced by the method.

7 Claims, 1 Drawing Sheet

METHOD OF PRODUCING INORGANIC SEMICONDUCTOR-OR PHOSPHOR-PRIMARY PARTICLE AND INORGANIC SEMICONDUCTOR-OR PHOSPHOR-PRIMARY PARTICLE

FIELD OF THE INVENTION

The present invention relates to a method of producing an inorganic semiconductor- or phosphor-primary particle, and an inorganic semiconductor- or phosphor-primary particle produced by the method. In particular, the present invention relates to a method of producing an inorganic particle including zinc sulfide as a host material (matrix), and an activator and a co-activator as luminescence center, which may be used for an electroluminescence (EL) phosphor with high luminance and long life; and the inorganic particle produced by the method.

BACKGROUND OF THE INVENTION

An inorganic electroluminescence (EL) light-emitting device (body) is a light-emitting device in which an alternating current electric field is applied to an inorganic phosphor particle sandwiched between two electrodes, to cause the phosphor to emit light. Known examples of the EL light-emitting device include dispersion-type EL light-emitting devices and thin-film-type EL light-emitting devices. The dispersion-type EL light-emitting device has a structure where a phosphor particle with a diameter of several μm dispersed in a binder with high dielectric constant are sandwiched between two electrodes at least one of which is transparent, is a plane light-emitting device allowing the light-emitting device to have a thickness of several mm or less, and has many advantages in that, e.g., there is no exothermic heat and a luminescent efficiency is favorable. Therefore, the dispersion-type EL light-emitting devices are expected to have many applications for traffic sings, lighting equipments for various interiors and exteriors, light sources for flat panel displays such as liquid-crystalline displays, light sources of lighting equipments for large-area advertising pillars, and the like.

As an EL phosphor particle for use in the inorganic EL light-emitting device, an inorganic semiconductor particle to which an activator (metal ion serving as a luminescence center) is added, is used. An EL phosphor particle well known comprises zinc sulfide as a host material thereof, along with an activator such as copper and a co-activator such as chlorine added thereto. However, the light-emitting device produced by using the phosphor particle has some drawbacks in that its luminance is low and its light emission life is short, as compared with those of light-emitting devices based on any other principle, and therefore, various improvements have heretofore been made on the phosphor particle.

In a typical method of synthesizing the phosphor particle including zinc sulfide as the host material, a zinc sulfide nano particle which is a raw material is subjected to a first sintering (baking) in combination with an inorganic salt, called a flux, at extremely high temperature of 1,300° C. to 1,000° C., to grow the particle with a micron size; and then a second sintering is performed at 500° C. to 1,000° C., to yield phosphor particle. This producing method is described in, for example, JP-A-8-183954 ("JP-A" means unexamined published Japanese patent application), JP-A-7-62342, and JP-A-6-330035. However, in this method, the sinterings are performed in a furnace at high temperature, making it difficult to add materials to the system from the start to the end of the sinterings. For example, it is impossible to change concentration distribution of the activator or the co-activator inside the particle. Thus, it is difficult to obtain a zinc sulfide phosphor particle with higher luminance.

Meanwhile, when the zinc sulfide particle is synthesized in a liquid phase, it is possible to add the activator or co-activator with its amount controlled during growth of the particle. Thus, it is possible to produce a phosphor particle in which the concentration distribution of the activator or co-activator inside the particle is changed, which cannot be obtained by the sintering method. Also, it becomes possible to obtain a zinc sulfide particle with monodisperse where a size distribution is narrow, by forming the particle in the condition that nucleus formation is separated from the growth, and controlling a supersaturation degree during growth of the particle.

As the method of synthesizing a zinc sulfide particle in the liquid phase used for the inorganic EL phosphor, there are a method of synthesizing a particle with a nano size in an aqueous system as disclosed in JP-A-2002-313568, and reports in which a crystal of zinc sulfide is grown up to submicron size in an aqueous system in "Fine Particles" (Surfactant Science Series, Volume 92, edited by Sugimoto, pp. 190-196), "Colloids and Surface A" (Vol. 135, pp. 207-226 (1998)), and "Crystal Research Technology" (Vol. 35, pp. 279-289 (2000)). However, a spherical particle obtained by the method described in "Fine Particles" is a secondary particle (aggregate of particles) formed by aggregating microcrystals with a nano size, and a particle obtained by the method described in "Colloids and Surface A" is also an aggregate of particles with small size. In these methods, a primary particle with a micron size which is desirable for the EL phosphor particle can not been obtained. Meanwhile, according to the method described in "Crystal Research Technology", a zinc sulfide primary particle with a submicron size can been obtained by placing a particle with a nano size previously prepared in a sealed vessel, and maturing the particle at a high temperature. However, it is difficult to modify the particle during growth of the particle in this method, and it is impossible to control the concentration distribution of an activator and co-activator inside the particle and the particle size distribution.

SUMMARY OF THE INVENTION

The present invention resides in a method of producing an inorganic semiconductor- or phosphor-primary particle, which comprises forming the particle by reacting at least one kind of precursor solution of the inorganic primary particle in a solvent, of which major component is water of a reacting vessel, under the conditions that the pressure is 0.2 to 20 MPa and the temperature is 120° C. to 370° C.

Further, the present invention resides in an inorganic semiconductor- or phosphor-primary particle formed by the above-described producing method.

Other and further features and advantages of the invention will appear more fully from the following description, taken in connection with the accompanying drawings.

DETAILED DESCRIPTION OF THE INVENTION

Figure 1:
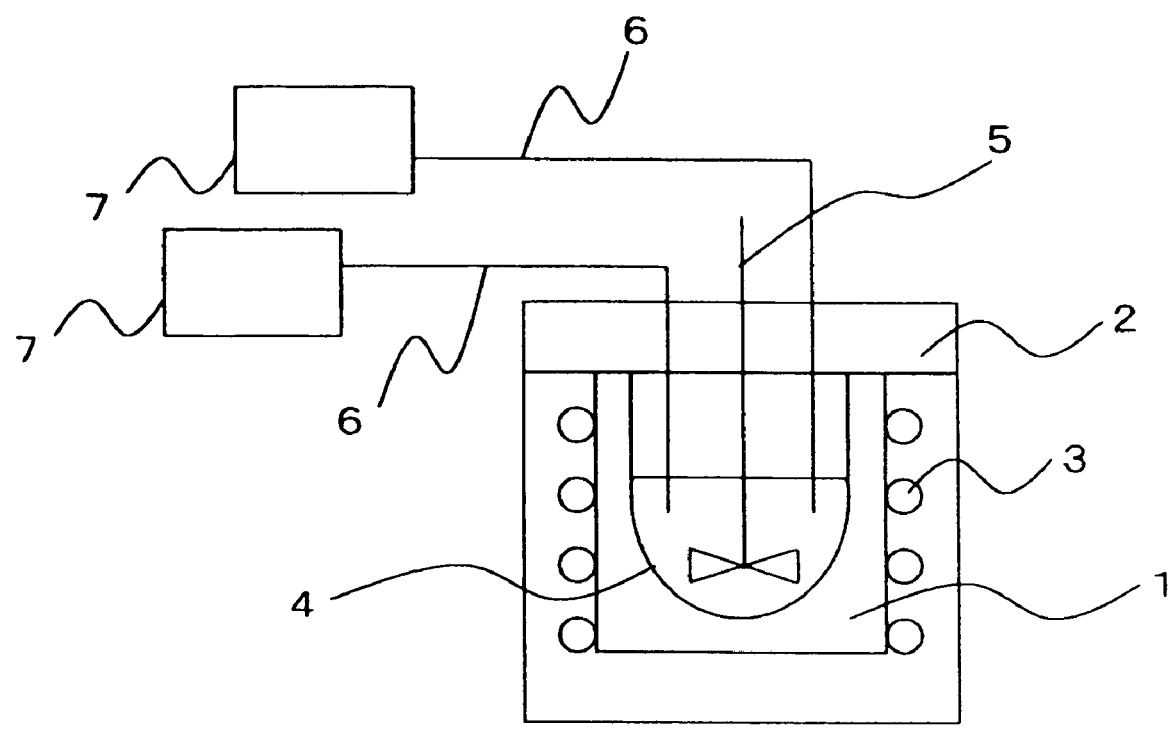
FIG. 1 is an explanatory schematic view of an apparatus for hydrothermal synthesis (system) used in Examples.

According to the present invention, there are provided the following means:

(1) A method of producing an inorganic semiconductor primary particle, which comprises forming the particle by reacting at least one kind of precursor solution of the inorganic semiconductor primary particle in a solvent, of which major component is water of a reacting vessel, under the conditions that the pressure is 0.2 to 20 MPa and the temperature is 120° C. to 370° C.;

(2) A method of producing an inorganic phosphor primary particle, which comprises forming the particle by reacting at least one kind of precursor solution of the inorganic phosphor primary particle in a solvent, of which major component is water of a reacting vessel, under the conditions that the pressure is 0.2 to 20 MPa and the temperature is 120° C. to 370° C.;

(3) The method of producing an inorganic particle according to the above item (1) or (2), wherein the precursor solution is an ionic aqueous solution;

(4) The method of producing an inorganic particle according to the above item (1) or (2), wherein the precursor solution contains an inorganic fine-particle with an average particle diameter of 1 to 50 nm;

(5) The method of producing an inorganic particle according to the above item (3), wherein the inorganic primary particle is formed by adding an aqueous solution containing sulfur ions and an aqueous solution containing zinc ions to the vessel, and reacting thereof by controlling the sulfur ion concentration in the reaction solution at the reacting vessel to be larger than the zinc ion concentration by $10^{-5}$ to 10 mol/L, for forming a zinc sulfide with an average particle diameter of 0.5 to 50 µm as a host material for the particle;

(6) The method of producing an inorganic particle according to any one of the above items (1) to (5), wherein a chelating agent having an amino group or carboxyl group is added;

(7) The method of producing an inorganic particle according to any one of the above items (1) to (6), wherein at least one metal element selected from the group consisting of copper, manganese, silver, gold, and rare earth elements is added as an activator;

(8) The method of producing an inorganic particle according to the above item (7), wherein the metal element as the activator is added by mixing an ion solution of the metal element with a chelating agent;

(9) The method of producing an inorganic particle according to any one of the above items (1) to (8), wherein an ion solution of at least one element selected from the group consisting of chlorine, bromine, iodine, and aluminum is added as a co-activator;

(10) An inorganic semiconductor- or phosphor-primary particle produced by the method according to any one of the above items (1) to (9), wherein a solubility product pKsp of the particle to water at 25° C. is in a range of 17 to 40;

(11) An inorganic semiconductor- or phosphor-primary particle produced by the method according to any one of the above items (1) to (9), wherein an average particle diameter of the inorganic particle is in the range of 0.1 to 100 µm;

(12) An inorganic semiconductor- or phosphor-primary particle produced by the method according to any one of the above items (1) to (9), wherein the inorganic particle is a metal sulfide;

(13) An inorganic semiconductor- or phosphor-primary particle produced by the method according to any one of the above items (1) to (9), wherein the inorganic particle is a metal oxide;

(14) An inorganic semiconductor- or phosphor-primary particle produced by the method according to any one of the above items (1) to (9), wherein the inorganic particle is a metal nitride; and

(15) An inorganic semiconductor- or phosphor-primary particle produced by the method according to any one of the above items (1) to (9), wherein the inorganic particle contains a zinc sulfide as a host material.

The present invention is described in detail below.

In the present invention, as the inorganic semiconductor, can be specifically included a semiconductor that is composed of one or more selected from the group consisting of elements of the II group and elements of the VI group, and/or one or more selected from the group consisting of elements of the III group and elements of the V group. Examples thereof include CdS, CdSe, CdTe, ZnS, ZnSe, ZnSSe, ZnTe, CaS, MgS, SrS, GaP, GaAs, ZnO, GaN, InN, AlN, and mixed crystals of these compounds. Among these, ZnS, ZnSe, ZnSSe, CaS, CaSrS, ZnO, and the like are preferably used; and ZnS and ZnSSe are particularly preferably used.

In the present invention, as the inorganic phosphor (inorganic fluorescent substance), can be specifically included a phosphor that is composed of one or more selected from the group consisting of elements of the II group and elements of the VI group, and/or one or more selected from the group consisting of elements of the III group and elements of the V group. Examples of a host material of the phosphor include CdS, CdSe, CdTe, ZnS, ZnSe, ZnSSe, ZnTe, CaS, MgS, SrS, GaP, GaAs, $BaAl_2S_4$, $Ba_2SiO_4$, $BaMgAl_{10}O_{17}$, $CaGa_2S_4$, $Ga_2O_3$, ZnO, $Zn_2SiO_4$, $Zn_2GaO_4ZnGa_2O_4$, $ZnGeO_3$, $ZnGeO_4$, $ZnAl_2O_4$, $CaGa_2O_4$, $CaGa_2S_4$, $CaGeO_3$, $Ca_2Ge_2O_7$, CaO, $CaWO_4$, $Ga_2O_3$, $GeO_2$, $SrAl_2O_4$, $SrGa_2O_4$, $SrGa_2S_4$, $SrP_2O_7$, $MgGa_2O_4$, $Mg_2GeO_4$, $MgGeO_3$, $BaAl_2O_4$, $Ga_2Ge_2O_7$, $BeGa_2O_4$, $Y_2SiO_5$, $Y_2GeO_5$, $Y_2Ge_2O_7$, $Y_4GeO_8$, $Y_2O_3$, $Y_2O_2S$, $YVO_4$, $YAlO_3$, $YBO_3$, $SnO_2$, $Gd_2O_2S$, $La_2O_2S$, LaOBr, $La_2O_2S$, GaN, InN, AlN, and mixed crystals of these compounds. Among these, ZnS, ZnSe, ZnSSe, CaS, CaSrS, ZnO, and the like are preferably used; and ZnS and ZnSSe are particularly preferable. Examples of an activator and co-activator preferably used for forming a luminescence center, which is added to the host material of the phosphor, include metal ions of Cu, Mn, Ag, Al, Au, Ga, Tl, Sn, Pb, Sb, Bi, Ti, and the like; rare earth element ions of Eu, Ce, Tb, Sm, and the like; and halide ions of Cl, Br, and the like.

Many of those semiconductors and phosphors are hardly soluble in water, but according to the producing method of the present invention, they can be produced even in a liquid phase. The solubility product pKsp (25° C.) of the produced semiconductor- or phosphor-particle to water is preferably from 17 to 40, more preferably from 17 to 35, and most preferably from 17 to 28. The solubility product pKsp (25° C.) of an individual semiconductor and phosphor can be easily obtained from the solubility described in, for example, "Handbook of Chemistry (Kagaku Binran)" edited by the Chemical Society of Japan.

When formed as a primary particle with a micron size, the hardly water-soluble semiconductor- and phosphor-compounds are problematic in their low solubility. Thus, in the present invention, the particle formation is carried out in a liquid phase under conditions of high temperature and high pressure. The particle formation is performed in a solvent containing water in a ratio of preferably 50 vol % or more, more preferably 70 vol % or more as a major component, at a temperature of preferably 120° C. to 370° C., more preferably from 150° C. to 350° C., and further preferably from 200° C. to 350° C. When the temperature of the solvent is excessively raised, the solvent becomes supercritical state, and the solubility of a compound to be dissolved in the solvent is conversely reduced, which are not preferable. In a case of water, water becomes the supercritical state at 375° C. or higher. To attain a high temperature of 100° C. or higher in an aqueous solvent, a tightly closable reaction vessel with pressure resistant structure is required. At that time, in the vessel, a saturated vapor pressure is raised with increasing temperature. In the present invention, the pressure in the vessel may be the saturated vapor pressure as it is, or may be pressurized from the outside. In the present invention, a pressure condition is preferably from 0.2 to 20 MPa, more preferably from 0.5 to 15 MPa, and more preferably from 1.5 to 15 MPa. In the present invention, the term "aqueous solvent" means a solvent mainly comprising of water, in which the ratio of the water is preferably at least 50% by weight.

The inorganic semiconductor- and phosphor-primary particles according to the present invention are produced by adding at least one reaction solution (precursor solution of the inorganic semiconductor- or phosphor-primary particle) to a liquid phase under such conditions of high temperature and high pressure. Here, examples of the reaction solution include an ionic aqueous solution containing elements for forming the inorganic semiconductor- or phosphor-primary particle, a solution of compounds which hydrolyze by means of heat to produce the inorganic semiconductor- or phosphor-primary particle, and a solution containing the inorganic semiconductor- or phosphor-fine-particle.

A semiconductor- or phosphor-fine-particle solution that can be used as a reaction solution is added as a mixed solution with a solvent containing water in the ratio of 50 vol % or more. The semiconductor- and phosphor-fine-particle solution each may be a solution previously prepared, or may be prepared during the particle formation in the other reaction apparatus just before the addition and added. As for the other reaction apparatus, it is possible to cite JP-B-7-23218 ("JP-B" means examined Japanese patent publication) and JP-A-10-43570. Each concentration of the semiconductor- and phosphor-fine-particle solution used is preferably 1 mM or more and 5 M or less, and more preferably 5 mM or more and 3 M or less. As semiconductor- and phosphor-fine-particle solutions, at least one solution may be added. For example, it is no matter to add solutions with different average particle sizes or solutions with different concentrations in combination with each other. The semiconductor- and phosphor-fine-particle solution each may be added alone or in combination with another ion solution. For example, it is also possible to change particle growth by adding the solution with a solution of a compound which dissolves the fine-particles.

The reaction solutions for producing the inorganic semiconductor- or phosphor-particle are continuously added. At this time, an aqueous solution(s) of an activator and/or co-activator can be also simultaneously added continuously. The reaction solutions, the activator, and the co-activator may be added according to various patterns. For example, it is preferable that the nucleation step be separated from the growth step, and the speed of each solution to be added be determined, to attain each optical supersaturation degree. The reaction solutions may be added at each constant flow rate or may be added intermittently, or it is also possible to increase each addition flow rate by stepwise or continuously, or decrease each addition flow rate by stepwise or continuously. The same holds true for the addition of aqueous solutions of an activator and a co-activator. A time for the particle formation is preferably within 100 hours, and more preferably within 12 hours and 5 minutes or more. It is preferable for regulation of the particle size to insert an Ostwald ripening step between a nucleus formation process and a growth process. This Ostwald ripening is performed at a temperature of preferably 120° C. to 370° C., and more preferably 200° C. to 350° C., and the ripening time is preferably from 5 minutes to 50 hours, and more preferably from 20 minutes to 10 hours.

As to the concentration of each reaction solution in a reaction vessel, each concentration of produced inorganic semiconductor- and phosphor-particles is preferably 1 mM or more and 5 M or less, and more preferably 5 mM or more and 3 M or less.

Each average particle diameter (size) of the semiconductor- and phosphor-particles produced by the method of the present invention is preferably from 0.1 to 100 μm, more preferably from 0.5 to 50 μm, and most preferably from 1 to 30 μm. The average particle diameter is obtained by the steps of: measuring each circle equivalent diameter of 200 particles on a SEM (scanning electron microscope) photograph of the particles; and calculating their average value. The produced semiconductor- and phosphor-particles each are obtained as a primary particle. Here, a secondary particle indicates a particle where smaller particles aggregate to increase an apparent particle diameter, and the primary particle means a non-aggregated particle. Meanwhile, each average particle diameter of the semiconductor- and phosphor-fine-particles that can be used for the reaction solution is obtained by the steps of: measuring each circle equivalent diameter of 200 particles on a TEM (transmission electron microscope) photograph of the particles; and calculating their average value. The average particle diameter of the semiconductor- and phosphor-fine-particles is preferably from 1 to 50 nm, and more preferably from 1 to 30 nm. The semiconductor- and phosphor-fine-particles each may be either a primary particle or a secondary particle.

In the present invention, the reaction solutions, for example a semiconductor- or phosphor-fine particle solution, are added to a reaction vessel set at a high temperature (e.g. from 120° C. to 370° C.) and a high pressure (e.g. from 0.2 to 20 MPa). Thus, in an apparatus used for producing the inorganic semiconductor- or phosphor-primary particle of the present invention, it is preferable to use a piping capable of injecting an aqueous solution into a pressure resistant vessel and a pressure resistant precision pump. Depending on the temperature and the pressure used, pressure tight and heat resistant glass, Teflon (trade name, tetrafluoroethylene) materials, metal materials such as stainless, and the like are used as materials of the apparatus. However, in the case of the metal materials, there is a possibility that a metal which becomes an impurity is eluted from the pressure resistant vessel during the particle formation, and thus the desired performance is not expressed. For example, in an EL phosphor containing zinc sulfide as a host material, particularly, iron, nickel, and cobalt are harmful metal ions that inhibit the luminescence, and it is necessary to avoid the use of them. Thus, materials not containing these harmful ions are used for the pressure resistant vessel, an addition pipe, stirrer, and other parts contacting with the solutions used for the particle formation. The material of the apparatus for producing the inorganic semiconductor- or phosphor-primary particle of the present invention is preferably a Teflon material, Hastelloy (trade name), titanium material or the like. Also, the apparatus for producing the particle that can be used in the present invention is preferably provided with a stirring mechanism. As to the stirrer, it is possible to refer to JP-B-55-10545, JP-B-49-48964, and the like.

Next, the present invention is described in detail by citing a phosphor particle for electroluminescence (hereinafter referred to as an "EL phosphor particle") containing zinc sulfide as a host material.

In the present invention, in order to obtain a zinc sulfide particle, it is preferable to retain a sulfur ion concentration in the reaction at an excessive level. The excessive sulfur ion concentration is favorably from $10^{-5}$ to 10 mol/L, and preferably from $10^{-3}$ to 1 mol/L based on zinc ions as a stoichiometric amount. The excessive sulfur ions may be added to an aqueous solvent before the reaction in advance, or the sulfur ion solution may be added more than the zinc ion solution, during the reaction.

When the zinc sulfide particle is prepared, it is preferable to use a chelating agent in the present invention, as a method of increasing the solubility of the zinc sulfide in water. As a chelating agent of Zn ion, those having an amino group and/or a carboxyl group are preferable. Specific examples of the chelating agent include ethylenediaminetetraacetic acid (hereinafter referred to as EDTA), N,2-hydroxyethylethylenediaminetriacetic acid (hereinafter referred to as EDTA-OH), diethylenetriaminepentaacetic acid, 2-aminoethylethylene-glycol-tetraacetic acid, 1,3-diamino-2-hydroxypropanetetraacetic acid, nitrilotriacetic acid, 2-hydroxyethyliminodiacetic acid, iminodiacetic acid, 2-hydroxyethylglycine, ammonia, methylamine, ethylamine, propylamine, diethylamine, diethylenetriamine, triaminotriethylamine, allylamine, and ethanolamine. The chelating agent may be used by dissolving in the aqueous solvent before the reaction, can be added alone as an aqueous solution, and can be also added by mixing with a fine-particle solution or the like.

The activator to be the luminescence center for the EL phosphor of the zinc sulfide host material may be anyone that is generally used as an activator for phosphors. For example, preferred for it are various metal ions of copper, manganese, silver, gold, rare earth elements, and the like. Concretely, acetates, sulfates, and the like of these elements are preferably used. These may be used either singly or in combination therewith. The wavelength (color) of fluorescence emission depends on the type of the activator. For example, fluorescence such as bluish green (copper), orange (manganese) and blue (silver) are obtained. The preferred range of the concentration of the activator depends on the type thereof. For example, for the copper activator, its concentration may be from 0.01 to 0.5 mol % in terms of the copper concentration relative to the host material, zinc sulfide in the final product. To dope the activating agent in the zinc sulfide particle, it is preferable to form a complex of a dope substance (dopant) and add the complex during, before or after the particle formation. The above chelating agent can be preferably used as a compound for the complex formation. At that time, it is preferred that the solubility of the complex of the dope substance is close to the solubility of the zinc sulfide particle. Concerning this, it is possible to refer to JP-A-2002-338961 and the like.

The co-activator is preferably a compound of a halide ion or aluminum ion, and, for example, more preferably a compound containing at least one element selected from the group consisting of chlorine, bromine, iodine, and aluminum. Most preferably, nitrates, sulfates, and the like of the aluminum ion are used. The preferable concentration of the co-activator depends on the type thereof. For example, in the case of an aluminum co-activator, the preferable concentration is in the range of 0.01 to 0.5 mol % in terms of the aluminum concentration based on zinc sulfide as the host material in the final product. When the aluminum ion is used as the co-activator, it is preferable to mix the aluminum ion with the above chelating agent and add the aluminum ion during, before or after addition of an aqueous solution of the activator ions.

It is also possible to perform the doping of the activator and the co-activator in the EL phosphor particle by the following manner: once preparing the zinc sulfide particle in a liquid phase; drying them to make powder; adding the activator and/or the co-activator to the powder; and sintering the mixture. At that time, the sintering temperature is preferably from 300° C. to 1,200° C., and more preferably from 400° C. to 1,000° C., and the sintering time is preferably from 30 minutes to 10 hours, and more preferably from 1 to 7 hours. During this sintering, a flux can be also added. Examples of the flux includes table salt, magnesium chloride, barium chloride, and ammonium chloride.

Also, impact modification (a treatment for applying an impact strength having an intensity within such a range that a particle is not broken) performed for improving luminescent property of the EL phosphor in the sintering method can be used for the EL phosphor particle of the present invention. Preferable examples of methods of applying the impact strength include a method of contacting and mixing the particles each other, a method of mixing spherical materials of alumina and the like (ball mill), a method of accelerating and crashing the particles; and a method of radiating ultrasonic waves to the particles.

The EL phosphor particle of the present invention may have, on the surface of each of them, a non-luminous shell layer. The formation of the shell layer is preferably conducted by a chemical method following the preparation of the phosphor particle, which will be a core. The thickness of the shell layers is preferably 0.01 µm or more, but 1.0 µm or less. The non-luminous shell layer can be made of an oxide, nitride, or oxide/nitride, or a substance that has the same composition as those formed on the host phosphor particle but contains no luminescence center. The shell layer can also be formed by epitaxially growing, on the host phosphor particle material, a substance which has a different composition from that of the particle. Examples of available methods of forming the non-luminescent shell layer include a vapor phase method, such as a combination of fluidized oil surface evaporation with electron beam method, laser ablation method, CVD (chemical vapor deposition) method, plasma CVD method, sputtering method, resistance heating, a complex degradation method, sol-gel method, ultrasonic chemical method, a method by heat degradation reaction of a precursor, reversed micelle method, a combination method of these methods with high temperature sintering, a liquid phase method, such as freezing drying method, hydrothermal synthesis method, urea melting method, and spray heat degradation method. In the present invention, the phosphor particle is synthesized in a liquid phase, and thus the formation of the non-luminous shell layer by means of the liquid phase methods is particularly preferable.

The obtained EL phosphor of the zinc sulfide host material doped with the activator and/or the co-activator in this way is washed with water, dried, washed with hydrochloric acid and a potassium cyanide solution, and dried, to yield EL phosphor powder. An EL luminescent layer is formed by dispersing this phosphor in an organic binder and coating the solution. The luminescent layer is disposed between a reflective insulating layer of a backside electrode and a transparent electrode to construct an electroluminescence device, which is then sealed up with a casing film to complete an electroluminescent lamp (EL light emitting device). When a voltage is imparted between the two electrodes, the phosphor in the luminescent layer emits light owing to the high electric field formed between the electrodes. When the phosphor particle is in an electric field, the electric field concentrates in a conductive layer in which the activators, such as copper ions, in the particle are localized, and a very high electric field is produced therein. As a result, electrons and holes are generated from the conductive layer and are recombined with each other through the activator and the co-activator to thereby emit light. In the EL phosphor particle, it is extremely important to efficiently effect the electron generation and the recombination. In the zinc sulfide phosphor particle of the present invention, the activator ions and co-activator ions can be freely localized in the particle, and thus it is believed that effective electron generation and recombination are performed. Furthermore, the phosphor particle of the present invention have uniformity in particle size distribution and low variation in particle structures among the particle, and thus can bring higher luminous efficiency.

Subsequently, an EL light-emitting device (hereinafter, an EL device) using the zinc sulfide EL phosphor particle of the present invention is described in detail.

The EL device of the present invention has a structure where a luminescent layer is sandwiched with a pair of opposed electrodes, at least one of which is transparent. It is preferred that a dielectric layer is adjacent between the luminescent layer and the electrodes. Those where the phosphor particle is dispersed in a binder can be used for the luminescent layer. As a binder, a polymer having a relatively high dielectric constant such as a cyanoethyl cellulose-series resin; polyethylene, polypropylene, polystyrene-series resins, silicone resins, epoxy resins, resins of a vinylidene fluoride, or the like can be used. The dielectric constant of the dielectric layer can be adjusted by properly mixing, for example, $BaTiO_3$ or $SrTiO_3$ fine particle having a high dielectric constant, into such a resin. It is possible to use a homogenizer, a planetary kneader, a roll kneader, an ultrasonic disperser, and the like, as a dispersing mean. The dielectric material to be used in the dielectric layer, may be made of any material that has a high dielectric constant, a high insulating property, and a high dielectric breakdown voltage. This material can be selected from metal oxides and nitrides. For example, any of the followings can be used: $TiO_2$, $BaTiO_3$, $SrTiO_3$, $PbTiO_3$, $KNbO_3$, $PbNbO_3$, $Ta_2O_3$, $BaTa_2O_6$, $LiTaO_3$, $Y_2O_3$, $Al_2O_3$, $ZrO_2$, $AlON$, and $ZnS$. Each of those may be installed as a homogeneous film, or may be used as a film having a particle structure. In the case of the homogeneous film, a method of preparing the dielectric film may be a vapor phase method such as sputtering method and vacuum deposition. In this case, a thickness of the film is generally in the range of 0.1 μm or more and 10 μm or less. Further, in the constitution of the device of the present invention, various protective layers, a filter layer, a light scattering or reflecting layer, and the like can be provided.

An EL phosphor particle-containing coating solution or a dielectric fine-particle-containing coating solution used for producing the EL device is a coating solution containing at least the EL phosphor particle or a coating solution containing a dielectric fine-particle, a binder, and a solvent which dissolves the binder. Each viscosity of the EL phosphor particle-containing coating solution and the dielectric fine-particle-containing coating solution is preferably in the range of 0.1 Pa·s or more and 5 Pa·s or less, and particularly preferably in the range of 0.3 Pa·s or more and 1.0 Pa·s or less at ambient temperature. When the viscosity of the EL phosphor particle-containing coating solution or the dielectric fine-particle-containing coating solution is too low, unevenness of film thickness of the coated film easily occurs, and the phosphor particle or dielectric fine-particle is sometimes separated/precipitated with the lapse of time after the dispersion. On the other hand, when the viscosity of the EL phosphor particle-containing coating solution or the dielectric fine-particle-containing coating solution is too high, it becomes difficult to coat the solution at a relatively high speed. The above viscosity is a value measured at 16° C., which is the same as a coating temperature.

It is preferred that the luminescent layer is continuously applied to a plastic support, to which a transparent electrode is provided, or the like using a slide coater, an extrusion coater, or the like, such that a dry film thickness of the coated film is in the range of 0.5 μm or more and 30 μm or less. In this case, a film thickness variation of the luminescent layer is preferably 12.5% or less, and particularly preferably 5% or less.

For each functional layer applied to the support, it is preferable that at least steps from an applying step to a drying step are continuously carried out. The drying step is divided into a constant rate drying step until the coated film is dried and solidified, and a falling rate drying step where a residual solvent of the coated film is reduced. In the present invention, a ratio of the binder in each functional layer is high, therefore, when the layer is dried rapidly, only a surface thereof is dried, to generate convection in the coated film. Thus, so-called Benard cell easily occurs, and a blister defect easily occurs owing to rapid expansion of the solvent, to noticeably impair homogeneousness of the coated film. On the other hand, when the final drying temperature is low, the solvent remains in each functional layer, to affect post-steps after making EL devices, such as laminating step of a moisture-proof film. Therefore, it is preferred that the constant rate drying step is slowly performed, and that the falling rate drying step is performed at the temperature sufficient to dry the solvent, in the drying step. As for a method of slowly performing the constant rate drying step, it is preferred that a drying room where the support runs is divided into plural zones and the drying temperature after completion of the coating step is raised in stepwise.

In the production of the EL device of the present invention, it is preferable that the luminescent layer is subjected to a calendar treatment using a calendar processor. Smoothness of both major faces of the luminescent layer formed by the calendar treatment is preferably in the range of 0.5 μm or less, and more preferably 0.2 μm or less, in terms of ten-point height of irregularities. The calendar processor used is not particularly limited, and can be appropriately selected from known apparatus. A smoothing treatment is conducted by passing the luminescent layer, where the phosphor particle is dispersed in the binder, between a pair of rolls at least one of which is heated at, for example, 50° C. to 200° C., while the layer is pressed. In the calendar treatment, it is preferred that the heating temperature of the calendar rolls is set to not lower than a softening temperature of the binder contained in the luminescent layer. It is preferred that a calendar pressure and a conveying speed are appropriately selected such that the phosphor particle is not broken and the luminescent layer is not extended beyond a necessary extent, considering the calendar temperature and a coating width of the luminescent layer, in order to obtain a necessary smoothness.

In the EL device of the present invention, generally used transparent electrode materials are arbitrarily used as a transparent electrode. Examples of the transparent electrode material include oxides such as tin-doped tin oxide, antimony-doped tin oxide, and zinc-doped tin oxide; multi-layer structure films of silver thin film sandwiched between high-refractive-index layers; and π-conjugated-series polymers, such as polyanilines and polypyrroles. It is also preferable to arrange a tandem-type, grid-type, or the like type metal fine line on the transparent electrode, thereby to improve current-carrying performance. The resistance value of the transparent electrode is preferably 0.01 Ω/□ or more but 30 Ω/□ or less. The back electrode, which is present on the side from which light is not taken out, may be made of any material that has electric conductivity. The material is appropriately selected from metals such as gold, silver, platinum, copper, iron and aluminum; graphite, and other materials, considering the form of the device to be produced, the temperature in producing steps, and other factors. A transparent electrode made of ITO or the like may be used, as long as it has electric conductivity. Each of the electrodes can be formed by preparing an electroconductive material-containing coating solution in which the above conductive fine-particle material is dispersed with a binder, and then applying the coating solution using the aforementioned slide coater or extrusion coater.

When a compensation electrode is arranged for inhibiting vibration of the EL device, the aforementioned electroconductive material can be also used. For example, when the compensation electrode is arranged outside the transparent electrode from which light is taken out, it is preferable to use a transparent electrode material of oxides such as tin-doped tin oxide, antimony-doped tin oxide, and zinc-doped tin oxide, a multilayer structure material in which a thin film of silver is sandwiched with high-refractive-index layers, or π conjugated-series polymers such as polyaniline and polypyrrole.

When the compensation electrode is arranged outside the back electrode from which light is not taken out, it is possible to use any material having electric conductivity, for example, metals, such as gold, silver, platinum, copper, iron, and aluminum; and graphite. A transparent electrode, such as ITO, may be used so long as it has electric conductivity. This compensation electrode is formed through an insulating layer on the above transparent electrode or back electrode. The insulating layer material can be formed by depositing or applying a dispersion in which an insulative inorganic material, polymer material, or inorganic material powder is dispersed in a polymer material. Also, the compensation electrode can be formed by preparing a electroconductive material-containing coating solution in which the above electroconductive fine-particle material is dispersed with a binder, and applying the solution using the aforementioned slide coater or extrusion coater. Furthermore, it is also possible that an insulating material-containing coating solution is prepared by dispersing the above insulating material with a binder, and the solution and the above-described electroconductive material-containing coating solution are applied simultaneously. A voltage is applied to the provided compensation electrode from a driving power supply. At that time, by making the phase of the voltage reverse to that of the voltage applied to the luminescent layer, it is possible to offset vibration generated in the luminescent layer. When the compensation electrode is provided through an insulating layer on the outside of either the transparent electrode or the back electrode, the same effect can be obtained. It is preferable to simultaneously provide two compensation electrodes on the outside of both the transparent electrode and the back electrode, and earth one of the compensation electrodes, because further vibration inhibition effects can be expected. It is preferable, for effectively performing the vibration inhibition, to regulate such that the dielectric constant of the luminescent layer (and the dielectric layer) and the dielectric constant of the insulating layer inside the compensation electrode are substantially equivalent.

As an another method for the vibration inhibition of the EL device, when a buffer material layer is provided on the EL device, it is preferable to use a polymer material with a high impact absorbability or a polymer material foamed by adding a foaming agent. Examples of the polymer material with the high impact absorbability include natural rubber, styrene-butadiene rubber, polyisoprene rubber, polybutadiene rubber, nitrile rubber, chloroprene rubber, butyl rubber, Hypalon (trade name), silicon rubber, urethane rubber, ethylene-propylene rubber, and fluorine-containing rubber. A hardness of these polymer materials is preferably 50 or less, and more preferably 30 or less in the point of vibration absorbability. Also, butyl rubber, silicon rubber, fluorine-containing rubber, and the like are more preferable because they have low water absorbing property and thus each of them functions as a protection film which protects the EL device from moisture. It is also preferable to use a material in which the above rubber materials, or polypropylene, polystyrene, or polyethylene resins are foamed by adding foaming agents, as a buffer material. The buffer material layer using these buffer materials can be provided by adhering the buffer material layer to the EL device with an adhesive agent. It is also possible to make the buffer material layer by dissolving the buffer material in a solvent to prepare a buffer material-containing coating solution, and applying the solution using the aforementioned slide coater or extrusion coater. A film thickness of the buffer material layer depends on the hardness of the polymer material. The film thickness requires 20 µm or more, and it is preferably 50 µm or more, to sufficiently absorb vibration. However, the thickness in excess of 200 µm is not preferable in terms of mass and flexibility because the device thickness is largely increased. The combination of the above compensation electrode with the buffer material layer is preferable because the vibration can be further inhibited.

In the EL device, it is preferable to use a thin-layered luminescent layer. The thin-layered luminescent layer enhances the luminance because the voltage applied to the luminescent layer becomes higher under the same driving condition than that in the case where the luminescent layer is thick as a conventional EL device. When driving for similar luminance to that of the conventional EL device, a driving voltage and a frequency can be reduced, and thus electricity consumption is reduced, and further the vibration and noise can be alleviated. To obtain such effects, the thickness of the luminescent layer is preferably in the range of 0.5 µm or more and 30 µm or less, and particularly preferably 15 µm or less. Furthermore, a total film thickness of the luminescent layer including the phosphor particle and the dielectric layer including the inorganic dielectric particle, which is, if necessary, adjacent to the luminescent layer containing the phosphor particle is preferably in the range of 1 µm or more and 50 µm or less, and particularly preferably 30 µm or less.

It is preferable that an average particle diameter of the phosphor particle of the present invention is in the range of 0.1 μm or more and 15 μm or less, in order to uniformly form the luminescent layer of 30 μm or less. A filling rate of the phosphor particle in the luminescent layer is not limited, and is preferably in the range of 60% by mass or more and 95% by mass or less, and more preferably in the range of 80% by mass or more and 90% by mass or less. In one embodiment of the present invention, by making the particle diameter of the phosphor particle to be 15 μm or less, uniformity of the film thickness of the coated film of the luminescent layer is enhanced, and smoothness of the surface of the coated film is also enhanced. Further, a significant increase in particle number per unit area noticeably alleviates fine unevenness in luminescent. Furthermore, the reduction of the particle diameter leads to an increase of the voltage applied to the phosphor particle. The reduction, as well as an increase of electric field strength of the luminescent layer by the thin-layered luminescent layer, is preferable for luminance enhancement of the EL device and for the inhibition of vibration which may cause noises.

The dielectric particle may be in the form of a thin film crystal layer or in the form of a particle, or may be a combination thereof. The dielectric layer including the dielectric particle may be provided on one side of the phosphor particle layer, and it is preferable to provide the dielectric layers at both sides of the phosphor particle layer. When the dielectric layer is formed by coating, as with the case of the luminescent layer, it is preferable to use the slide coater or the extrusion coater. In the case of the thin film crystal layer, the layer may be a thin film formed on a substrate by a vapor phase method such as sputtering and the like, or may be a sol-gel film formed by using alkoxide of Ba, Sr, or the like. In the case of the particle form, the size thereof is preferably sufficiently smaller than that of the phosphor particle. Specifically, the size of the dielectric particle is preferably in the range of $1/1,000$ or more and $1/3$ or less of the phosphor particle size.

The dispersed-type EL device is finally processed using a sealing film to exclude the effects of humidity and oxygen from an external environment. In the sealing film for sealing the EL device, a water vapor permeability at 40° C. and 90% RH is preferably 0.05 $g/m^2/day$ or less, and more preferably 0.01 $g/m^2/day$ or less. Furthermore, an oxygen permeability at 40° C. and 90% RH is preferably 0.1 $cm^3/m^2/day/atm$ or less, and more preferably 0.01 $cm^3/m^2/day/atm$ or less. A laminated film of an organic film and an inorganic film is preferably used as such a sealing film. As the organic film, polyethylene-series resins, polypropylene-series resins, polycarbonate-series resins, polyvinyl alcohol-series resins, and the like are preferably used, and particularly the polyvinyl alcohol-series resins can be more preferably used. The polyvinyl alcohol-series resins and the like have water absorbing property, and thus it is more preferable to use those brought into an absolute dry state by a treatment such as vacuum heating in advance.

The inorganic film is deposited using deposition, sputtering, CVD method, or the like on the product obtained by processing those resins into a sheet form by coating or the like. As the deposited inorganic films, silicon oxide, silicon nitride, silicon oxide/nitride, silicon oxide/aluminum oxide, aluminum nitride, and the like are preferably used, and, in particularly, silicon oxide is more preferably used. In order to obtain a lower water vapor permeability and oxygen permeability, and prevent the inorganic film from being cracked by bending or the like, it is preferable to make a multiple layered film by repeating the formation of the organic film and the inorganic film or by laminating multiple organic films having deposited inorganic films thereon via an adhesive layer. The film thickness of the organic film is preferably in the range of 5 μm or more and 300 μm or less, and more preferably in the range of 10 μm or more and 200 μm or less. The film thickness of the inorganic film is preferably in the range of 10 nm or more and 300 nm or less, and more preferably in the range of 20 nm or more and 200 nm or less. The film thickness of the laminated sealing film is preferably in the range of 30 μm or more and 1,000 μm or less, and more preferably in the range of 50 μm or more and 300 μm or less. For example, to obtain a sealing film with a water vapor permeability of 0.05 $g/m^2/day$ or less at 40° C. and 90% RH, in the case of a structure in which each two of organic films and two inorganic films are laminated, a film thickness of 50 to 100 μm is sufficient. In the case of poly(trifluoroethylene chloride) conventionally used as the sealing film, a film thickness of 200 μm or more is required. A thinner film thickness of the sealing film is preferable in terms of light permeability and device flexibility.

When an EL cell is sealed with this sealing film, the EL cell may be sealed by sandwiching the EL cell with two sealing films to seal the periphery, or by folding one sealing film in half and gluing/sealing an overlapped part of the sealing film. For the EL cell sealed with the sealing film, only the EL cell may be separately made, or the EL cell can be made directly on the sealing film. It is preferable to perform the sealing step in a vacuum or a drying atmosphere where a dew point is controlled.

Even when high level sealing is carried out, it is preferable to arrange a drying agent layer around the EL cell. Preferable examples of the drying agent (hygroscopic agent) used for the drying agent layer include alkali earth metal oxides such as CaO, SrO, and BaO, aluminum oxide, zeolite, activated carbon, silica gel, paper, and resins with high hygroscopic property. Of those, in particular, the alkali earth metal oxides are more preferable in terms of hygroscopic property. Those drying agents can be used in a powder state, and, for example, it is preferable to arrange the drying agent layer by mixing the drying agent with a resin material, and then by coating or molding to process into a sheet shape; or by mixing the drying agent with a resin material to prepare a coating solution, and then applying the solution to the surrounding of the EL device using a dispenser or the like. Furthermore, it is preferable to cover not only the surrounding of the EL cell but also the upper and lower faces of the EL cell with the drying agent. In this case, it is preferable to select a drying agent layer with high transparency for the face from which light is taken out. It is possible to use polyamide-series resins or the like as the drying agent layer with high transparency.

The inorganic particle of the present invention are not particularly restricted in their application. However, taking the application as a light source into consideration, preferably the luminescent color of the EL device using the inorganic particle of the present invention is a white color. As a method of making the luminous color white, use can be preferably made, for example, of a method of using a phosphor particle capable of self-emitting a white light such as zinc sulfide phosphor activated with copper and manganese and gradually cooled after baking, or a method of mixing two or more kinds of phosphors capable of emitting three primary colors or complementary colors from each other (e.g. a combination of blue, green and red, and a combination of bluish green and orange). It is also preferable to use a method of making the luminous color white according to the steps of emitting a short-wavelength light such as blue, and then using a fluorescent pigment or a fluorescent dye, thereby to wavelength-convert (emit) a part of the emission to green and red, as described in JP-A-7-166161, JP-A-9-245511 and JP-A-2002-62530. Further, as CIE chromaticity coordinates (x, y), it is preferable that the value x is in the range of 0.30 to 0.43 and the value y is in the range of 0.27 to 0.41.

According to the present invention, it is possible to provide a method of producing an inorganic semiconductor- or phosphor-primary particle with a micron size in a liquid phase. Further, according to the present invention, it is possible to provide a method of producing a phosphor including zinc sulfide as a host material.

According to the present invention, primary particles are produced without causing aggregation. According to the present invention, it is possible to produce a semiconductor- or phosphor-primary particle, not an aggregate of nano size particles. In particularly, according to the present invention, it is possible to efficiently produce a phosphor particle for used as an EL device, with high luminance, in a liquid phase.

The present invention will be described in more detail based on the following examples, but the present invention is not limited thereto.

EXAMPLES

Example 1

Synthetic Example 1

To 150 mL of purified water retained at 300° C. (the pressure was naturally turned to about 9 MPa), 150 mL of 0.1 mol/L sodium sulfide ($Na_2S$) aqueous solution and 150 mL of 0.1 mol/L zinc nitrate ($Zn(NO_3)_2$) as reaction solutions were simultaneously added at a constant speed over 150 minutes with stirring at 400 rpm.

An outline of the reaction apparatus used for particle formation is shown in FIG. 1. In FIG. 1, the apparatus was equipped with a pressure resistant vessel 1 including a heater 3, and a pressure resistant cover 2, and it was designed to resist a pressure of 20 MPa. The pressure resistant vessel had therein a sample vessel 4 for holding a sample, and the sample solution in the vessel was stirred by a stirrer 5. The heater 3 was wounded around the pressure resistant vessel 1 spirally. An addition solution was added into the sample solution through a introducing pipe 6 by a pressure resistant precision pump 7 having a pressure resistance of 30 MPa. All parts which contact with the sample solution in the reaction apparatus were made of titanium.

An average particle diameter of the produced particle was 2.0 μm, and the particle was found to be zinc oxide from an X-ray diffraction pattern. A peak of the X-ray diffraction was extremely sharp, which indicated that the produced particle was a primary particle and was not an aggregate of a nano particle.

Synthetic Example 2

The particle formation was carried out according to Synthetic Example 1, except that the reaction solutions were added to 150 mL of purified water retained at 60° C. The average particle diameter of the produced particle was 0.4 μm, and the particle was found to be zinc sulfide from an X-ray diffraction pattern. A peak of the X-ray diffraction was extremely broad, which indicated that the produced particle was a secondary particle and was an aggregate of a nano particle.

Synthetic Example 3

The particle formation was carried out according to Synthetic Example 1, except that the reaction solutions were added to 150 mL of 0.1 mol/L $Na_2S$ aqueous solution retained at 300° C. (the pressure was naturally turned to about 9 MPa). The average particle diameter of the produced particle was 0.8 μm, and the particle was found to be zinc sulfide with zinc-blende crystal structure from an X-ray diffraction pattern. A peak of the X-ray diffraction was extremely sharp, which indicated that the produced particle was a primary particle and was not an aggregate of a nano particle.

Synthetic Example 4

Using the reaction apparatus shown in FIG. 1, to 150 mL of 0.1 mol/L $Na_2S$ aqueous solution retained at the temperature of 300° C. (the pressure was naturally turned to about 9 MPa), 150 mL of 0.1 mol/L $Na_2S$ aqueous solution, and 150 mL of a mixed solution of 0.1 mol/L $Zn(NO_3)_2$ aqueous solution and 0.05 mol/L tetrasodium ethylenediamine tetraacetate aqueous solution, were simultaneously added at a constant speed over 150 minutes with stirring at 400 rpm. The average particle diameter of the produced particle was 2.0 μm, and the particle was found to be zinc sulfide with zinc-blende crystal structure from an X-ray diffraction pattern. A peak of the X-ray diffraction was extremely sharp, which indicated that the produced particle was a primary particle and was not an aggregate of a nano particle.

Characteristics of the particles produced in Synthetic Examples 1 to 4 are summarized in Table 1. The average particle diameter of each particles was obtained from an SEM photograph of the particle, the crystal structure thereof was obtained from an X-ray diffraction pattern, and discrimination of the primary particle from the secondary particle (aggregate) was performed by means of a half value width of the X-ray diffraction peak.

TABLE 1

| Sample | Remarks | Crystal structure | Average particle diameter | State of the particle |
| --- | --- | --- | --- | --- |
| Synthetic Example 1 | This invention | Zinc oxide | 2.0 μm | Primary particle |
| Synthetic Example 2 | Comparative example | Zinc sulfide | 0.4 μm | Aggregate of nano particle |
| Synthetic Example 3 | This invention | Zinc sulfide (Zinc-blende structure) | 0.8 μm | Primary particle |
| Synthetic Example 4 | This invention | Zinc sulfide (Zinc-blende structure) | 2.0 μm | Primary particle |

Table 1 shows that an inorganic semiconductor primary particle having a particle diameter of a μm order can be produced by the producing method of the present invention.

Example 2

(Preparation of Fine-Particle Solution A)

Into a flask with three necks, a solution prepared by dissolving 5 g of gelatin in 100 mL of purified water was placed, and 150 mL of 0.1 mol/L $Na_2S$ aqueous solution and 150 mL of 0.1 mol/L $Zn(NO_3)_2$ aqueous solution were simultaneously added thereto rapidly at 50° C. with stirring, to prepare a fine-particle solution A of zinc sulfide. The average particle diameter of the produced fine-particle was 18 nm.

(Preparation of Fine-Particle Solution B)

Into a flask with three necks, a solution prepared by dissolving 2 g of gelatin in 100 mL of purified water was placed, and 150 mL of 0.1 mol/L $Na_2S$ aqueous solution and 150 mL of 0.1 mol/L $Zn(NO_3)_2$ aqueous solution were simultaneously added thereto rapidly at 80° C. with stirring, to prepare a fine-particle solution B of zinc sulfide. The average particle diameter of the produced fine-particle was 40 nm.

Synthetic Example 5

Using the reaction apparatus shown in FIG. 1, to 150 mL of 0.1 mol/L $Na_2S$ aqueous solution retained at the temperature of 300° C. (the pressure was naturally turned to about 9 MPa), 15 mL of 0.1 mol/L $Na_2S$ aqueous solution and 15 mL of 0.1 mol/L $Zn(NO_3)_2$ aqueous solution were simultaneously added at a constant speed for 10 minutes with stirring at 400 rpm. Subsequently, 360 mL of the fine-particle solution A was slowly added thereto at a constant speed over 360 minutes. The average particle diameter of the produced particle was 2.0 µm, and the particle was found to be zinc sulfide with zinc-blende crystal structure from an X-ray diffraction pattern. A peak of the X-ray diffraction was extremely sharp, which indicated that the produced particle was a primary particle and was not an aggregate of a nano particle.

Synthetic Example 6

Using the reaction apparatus shown in FIG. 1, to 150 mL of 0.1 mol/L $Na_2S$ aqueous solution retained at the temperature of 300° C. (the pressure was naturally turned to about 9 MPa), 15 mL of 0.1 mol/L $Na_2S$ aqueous solution and 15 mL of 0.1 mol/L $Zn(NO_3)_2$ aqueous solution were simultaneously added at a constant speed for 2 minutes with stirring. After the mixture was kept at 300° C. for one hour, 180 mL of the fine-particle solution A was added to the mixture at a constant speed for 180 minutes, and subsequently 180 mL of the fine-particle solution B was added at a constant speed over 120 minutes. After completion of the addition, the solution was further kept at 300° C. for one hour. An average particle diameter of the produced particle was 5.0 µm, and the particle was found to be zinc sulfide with zinc-blende crystal structure, and to be a primary particle from an X-ray diffraction pattern.

Synthetic Example 7

Using the reaction apparatus shown in FIG. 1, to 150 mL of 0.1 mol/L $Na_2S$ aqueous solution retained at the temperature of 300° C. (pressure was naturally turned to about 9 MPa), 50 mL of the fine-particle solution B was added, and the mixture was kept at 300° C. for one hour. Subsequently, 350 mL of the fine-particle solution A was added thereto at a primary acceleration over 180 minutes with stirring. After completion of the addition, the solution was further kept at 300° C. for three hours. The average particle diameter of the produced particle was 1.0 µm, and the particle was found to be zinc sulfide with zinc-blende crystal structure, and to be a primary particle from an X-ray diffraction pattern.

Synthetic Example 8

Using the reaction apparatus shown in FIG. 1, to 150 mL of 0.1 mol/L $Na_2S$ aqueous solution retained at the temperature of 300° C. (the pressure was naturally turned to about 9 MPa), 15 mL of 0.1 mol/L $Na_2S$ aqueous solution and 15 mL of a mixed solution of 0.1 mol/L $Zn(NO_3)_2$ aqueous solution and 0.05 mol/L tetrasodium ethylenediamine tetraacetate aqueous solution, were simultaneously added at a constant speed over 30 minutes with stirring. Subsequently, 360 mL of the fine-particle solution A was slowly added thereto over 300 minutes. The average particle diameter of the produced particle was 3.0 µm, and the particle was found to be zinc sulfide with zinc-blende crystal structure, and to be a primary particle from an X-ray diffraction pattern.

Synthetic Example 9

The synthesis was performed in the same manner as Synthetic Example 5, except that 0.1 mol/L tetrasodium ethylenediamine tetraacetate aqueous solution was also simultaneously added at the addition of the fine-particle solution A. The average particle diameter of the produced particle was 4.0 µm, and the particle was found to be zinc sulfide with zinc-blende crystal structure, and to be a primary particle from an X-ray diffraction pattern.

Example 3

Synthetic Example 10

Using the stirrer shown in FIG. 3 in JP-B-55-10545, an experiment was performed according to the method of the above Synthetic Example 3. As a result, it was possible to favorably obtain a primary particle of zinc sulfide with the average particle diameter of 0.6 µm and zinc-blende structure.

Synthetic Example 11

Using the stirrer shown in FIG. 6 in JP-B-55-10545, an experiment was performed according to the method of the above Synthetic Example 3. As a result, it was possible to favorably obtain a primary particle of zinc sulfide with the average particle diameter of 0.9 µm and zinc-blende structure.

Synthetic Example 12

A particle was produced by adding the solutions while accelerating such that each addition speed of the solutions to be added became an upper limit of a critical growth speed of the particle (the speed at which no nucleus was produced again) in the method of Synthetic Example 4. As a result, it was possible to favorably obtain a primary particle of zinc sulfide with the average particle diameter of 2.5 µm and zinc-blende structure.

Synthetic Example 13

An experiment was carried out in the same method as Synthetic Example 5, except that, in place of the zinc sulfide fine-particle solution A, a zinc sulfide fine-particle solution C (the average particle diameter of the fine-particle: 10 nm) prepared by mixing 150 mL of a solution including 0.1 mol/L $Na_2S$ aqueous solution and 5% by weight low molecular weight gelatin, and 150 mL of 0.1 mol/L $Zn(NO_3)_2$ aqueous solution at 50° C. in a mixer described in JP-B-7-23218 was used, and that the solution C was added immediately after the preparation of the solution C. As a result, it was possible to favorably obtain a primary particle of zinc sulfide with the average particle diameter of 4.0 µm and zinc-blende structure.

Example 4

Synthetic Example 14

Using the reaction apparatus shown in FIG. 1, to 150 mL of 0.1 mol/L $Na_2S$ aqueous solution retained at the temperature of 300° C. (the pressure was naturally turned to about 9 MPa), 15 mL of 0.1 mol/L $Na_2S$ aqueous solution and 15 mL of 0.1 mol/L $Zn(NO_3)_2$ aqueous solution were simultaneously added at a constant speed over 15 minutes with stirring. Subsequently, 15 mL of 0.1 mol/L $Na_2S$ aqueous solution, and 135 mL of a mixed solution of 0.1 mol/L of $Zn(NO_3)_2$, 0.0005 mol/L of $Cu(NO_3)_2$, and 0.0005 mol/L of tetrasodium ethylenediamine tetraacetate, were simultaneously added thereto at a constant speed over 135 minutes with stirring. The obtained particle was repeatedly washed with water until the conductivity of a centrifuged supernatant of the solution became 100 μS or less. After that, glass beads of 1 mm in a 10-time amount based on the weight of the particle were added to the solution including the particle, and the mixture was slowly stirred at 40 rpm for 48 hours. Subsequently, the glass beads were removed by a screen, and the particle was separated by centrifugation, treated with a KCN solution, washed with water, and dried to yield phosphor powder.

Synthetic Example 15

The same manipulation as that of Synthetic Example 14 was performed, except that the solutions added in the second stage were changed to 15 mL of 0.1 mol/L $Na_2S$ aqueous solution and 135 mL of a mixed solution of 0.1 mol/L of $Zn(NO_3)_2$, 0.0005 mol/L of $CuCl_2$, and 0.0005 mol/L of tetrasodium ethylenediamine tetraacetate.

Synthetic Example 16

The same manipulation as that of Synthetic Example 14 was performed, except that the solutions added in the second stage were changed to 15 mL of 0.1 mol/L $Na_2S$ aqueous solution and 135 mL of a mixed solution of 0.1 mol/L of $Zn(NO_3)_2$, 0.0005 mol/L of $Cu(NO_3)_2$, 0.0005 mol/L of $Al(NO_3)_3$, and 0.0005 mol/L of tetrasodium ethylenediamine tetraacetate.

(Preparation of Fine-Particle Solution D)

To a solution prepared by dissolving 5 g of gelatin in 100 mL of purified water, 150 mL of 0.1 mol/L $Na_2S$ aqueous solution and 150 mL of a mixed solution of 0.1 mol/L of $Zn(NO_3)_2$, 0.0005 mol/L of $Cu(NO_3)_2$, 0.0005 mol/L of $Al(NO_3)_3$, and 0.0005 mol/L of tetrasodium ethylenediamine tetraacetate were simultaneously added rapidly at 50° C. with stirring, to prepare a fine-particle solution D of zinc sulfide. The average particle diameter of the produced particle was 25 nm.

Synthetic Example 17

Using the reaction apparatus shown in FIG. 1, to 150 mL of 0.1 mol/L $Na_2S$ aqueous solution retained at the temperature of 300° C. (the pressure was naturally turned to about 9 MPa), 15 mL of 0.1 mol/L $Na_2S$ aqueous solution and 15 ml of 0.1 mol/L $Zn(NO_3)_2$ aqueous solution were simultaneously added at a constant speed over 15 minutes with stirring. After the mixture was kept at 300° C. for one hour, 360 mL of the fine-particle solution D was added thereto at a constant speed over 300 minutes. After completion of the addition, the solution was further kept at 300° C. for three hours. The obtained particle was repeatedly washed with water by ultrafiltration until the conductivity of a centrifuged supernatant of the solution became 100 μS or less. After that, glass beads of 1 mm in a 10-time amount based on the weight of the particle were added to the solution including the particle, and the mixture was slowly stirred at 40 rpm for 48 hours. Subsequently, the glass beads were removed by a screen, and the particle was separated by centrifugation, treated with a KCN solution, washed with water, and dried to yield phosphor powder.

Characteristics of the particles produced in the Synthetic Examples 14 to 17 are summarized in Table 2. The average particle diameter of each particles was obtained from an SEM photograph of the particle, the crystal structure thereof was obtained from an X-ray diffraction pattern, and discrimination of the primary particle from the secondary particle (aggregate) was performed by means of a half value width of the X-ray diffraction peak. Also, the ratio of Cu content into the particle was analyzed by the steps: performing an ashing treatment with concentrated nitric acid to the particle powder; dissolving the treated powder in purified water; and conducting an ICP analysis method.

TABLE 2

| Sample | Crystal structure | Average particle diameter | State of the particle | Ratio of Cu content into the particle (mol % vs. Zn) |
|---|---|---|---|---|
| Synthetic Example 14 | Zinc sulfide (Zinc-blende structure) | 0.8 μm | Primary particle | 0.079 |
| Synthetic Example 15 | Zinc sulfide (Zinc-blende structure) | 0.8 μm | Primary particle | 0.14 |
| Synthetic Example 16 | Zinc sulfide (Zinc-blende structure) | 0.8 μm | Primary particle | 0.087 |
| Synthetic Example 17 | Zinc sulfide (Zinc-blende structure) | 0.7 μm | Primary particle | 0.092 |

Example 5

The EL elements were produced using the zinc sulfide particles prepared in Synthetic Examples 14 to 17, and were evaluated for luminescent property. The viscosity of each coating solution was measured using a viscometer (VISCONIC ELD. R (trade name) and VISCOMETER CONTROLLER E-200 (trade name) rotor No. 71 manufactured by Tokyo Keiki Co., Ltd.) under stirring (rotation number: 20 rpm) at a liquid temperature of 16° C.

(Preparation of Phosphor Coating Solution)

The zinc sulfide EL phosphors prepared in Synthetic Examples 14 to 17 and cyano resin (CR-S (trade name) manufactured by Shin-Etsu Chemical Co., Ltd.) as a binder were added in the following composition ratio into a DMF (N,N-dimethylformamide) organic solvent, and each mixture was dispersed by using a propeller mixer (rotation number: 3,000 rpm), to prepare EL phosphor particle-containing coating solutions with a viscosity of 0.5 Pa·s at 16° C.

| | |
|---|---|
| Zinc sulfide EL phosphors prepared in Synthetic Examples 14 to 17 | 100 weight parts |
| Cyano resin | 25 weight parts |

(Preparation of Dielectric Fine-Particle-Containing Coating Solution)

Barium titanate (BT-8 (trade name) manufactured by Cabot Specialty Chemicals, the average particle diameter: 120 nm) as a dielectric fine-particle and cyano resin (CR-S (trade name) manufactured by Shin-Etsu Chemical Co., Ltd.) as a binder were added in the following composition ratio into a DMF organic solvent, and the mixture was dispersed by using a propeller mixer (rotation number: 3,000 rpm), to prepare a dielectric fine-particle-containing coating solution with a viscosity of 0.5 Pa·s at 25° C.

| | |
|---|---|
| Barium titanate | 90 weight parts |
| Cyano resin | 30 weight parts |

(Production and Evaluation of EL Element)

Onto a polyethylene terephthalate (thickness: 100 μm), as a support, to which an ITO transparent electrode was sputtered, using a slide coater, each EL phosphor particle-containing coating solution was applied such that the target film thickness of the dried coated film was 20 μm. After the application, the support was dried at 120° C., to give a sheet-form laminate A in which an EL phosphor layer was formed on the ITO electrode. Subsequently, the sheet-form laminate A was again set to a coating apparatus in which the aforementioned slide coater was arranged. In the same manner as in the case of applying the coating solution of the phosphor layer, a dielectric fine-particle-containing coating solution was applied such that the dried film thickness of the coated film was 10 μm, and the support was dried, to give a sheet-form laminate B in which the EL phosphor layer and a dielectric layer were laminated on the ITO electrode. On the sheet-form laminate B, an aluminum foil with a thickness of 30 μm was attached as a back electrode. Lead wires to supply a voltage to the transparent electrode and the back electrode were provided thereto, and the whole was sealed with a sealing film, to give EL devices. When an alternating current with 100 V and 1 kHz was applied to these EL devices, the EL devices each exhibited favorable luminescent property.

Having described our invention as related to the present embodiments, it is our intention that the invention not be limited by any of the details of the description, unless otherwise specified, but rather be construed broadly within its spirit and scope as set out in the accompanying claims.

We claim:

1. A method of producing an inorganic phosphor primary particle, which comprises:

forming the particle by reacting at least one kind of precursor solution of the inorganic phosphor primary particle in a solvent, of which major component is water of a reacting vessel, under the conditions that the pressure is 0.2 to 20 MPa and the temperature is 120° C. to 370° C., in the presence of a chelating agent comprising an amino group and a carboxyl group, wherein the inorganic phosphor primary particle contains a zinc sulfide as a host material.

2. The method of producing an inorganic phosphor primary particle according to claim 1, wherein the precursor solution is an ionic aqueous solution.

3. The method of producing an inorganic phosphor primary particle according to claim 1, wherein the precursor solution contains an inorganic fine-particle with an average particle diameter of 1 to 50 nm.

4. The method of producing an inorganic phosphor primary particle according to claim 2, wherein the inorganic primary particle is formed by adding an aqueous solution containing sulfur ions and an aqueous solution containing zinc ions to the vessel, and reacting thereof by controlling the sulfur ion concentration in the reaction solution at the reacting vessel to be larger than the zinc ion concentration by $10^{-5}$ to 10 mol/L, for forming a zinc sulfide with an average particle diameter of 0.5 to 50 μm as a host material for the particle.

5. The method of producing an inorganic phosphor primary particle according to claim 1, wherein at least one metal element selected from the group consisting of copper, manganese, silver, gold, and rare earth elements is added as an activator.

6. The method of producing an inorganic phosphor primary particle according to claim 5, wherein the metal element as the activator is added by mixing an ion solution of the metal element with a chelating agent.

7. The method of producing an inorganic phosphor primary particle according to claim 1, wherein an ion solution of at least one element selected from the group consisting of chlorine, bromine, iodine, and aluminum is added as a co-activator.

\* \* \* \* \*